United States Patent
Patel et al.

(10) Patent No.: US 12,432,113 B2
(45) Date of Patent: Sep. 30, 2025

(54) SERVICE LEVEL ENFORCEMENT IN DISTRIBUTED SYSTEM BASED ON IMPACT OF ENFORCEMENT ACTIONS

(71) Applicant: Dell Products L.P., Round Rock, TX (US)

(72) Inventors: Dharmesh M. Patel, Round Rock, TX (US); John A. Lockman, III, Granite Shoals, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/478,129

(22) Filed: Sep. 29, 2023

(65) Prior Publication Data

US 2025/0112822 A1    Apr. 3, 2025

(51) Int. Cl.
*H04L 41/0816*  (2022.01)
*H04L 9/40*  (2022.01)
*H04L 41/5009*  (2022.01)

(52) U.S. Cl.
CPC ...... *H04L 41/0816* (2013.01); *H04L 41/5009* (2013.01); *H04L 63/1416* (2013.01)

(58) Field of Classification Search
CPC ............. H04L 41/0816; H04L 41/5009; H04L 63/1416
See application file for complete search history.

(56) References Cited

U.S. PATENT DOCUMENTS

| | | | |
|---|---|---|---|
| 7,890,612 B2 | 2/2011 | Todd | |
| 8,189,486 B2 * | 5/2012 | Krishnaswamy | ....... H04L 69/40 370/242 |
| 8,696,765 B2 | 4/2014 | Mendez | |
| 8,850,507 B2 | 9/2014 | Reisman | |
| 9,294,386 B2 | 3/2016 | Narad | |
| 9,354,126 B2 | 5/2016 | Chainer et al. | |
| 9,534,967 B2 | 1/2017 | Chainer et al. | |
| 10,652,038 B2 | 5/2020 | Juneau | |

(Continued)

OTHER PUBLICATIONS

"Management vs. Control vs. Data Planes in a Network Device," Codilime, Dec. 22, 2022, Web Page <https://codilime.com/blog/management-plane-vs-control-plane-vs-data-plane/> accessed on Sep. 28, 2023 (8 Pages).

(Continued)

*Primary Examiner* — Joe Chacko
(74) *Attorney, Agent, or Firm* — WOMBLE BOND DICKINSON (US) LLP

(57) ABSTRACT

Methods and systems for managing the operation of a deployment are provided. The deployment may be managed in accordance with a subscription model. The subscription model may use subscriptions to define the extent and limits on use of services provided by the deployment. The subscription services and limits may be enforced by management controllers of network devices of the deployment. The management controllers may operate independently from control planes and data planes of the network devices. If a plane is suspected of being compromised, the management controllers may take action to confirm the suspicions. If confirmed, then remedial activity may be initiated to address the compromised control plane. The remedial activity may be selected based on levels of impact on different services that utilize the network devices.

20 Claims, 8 Drawing Sheets

(56) References Cited

U.S. PATENT DOCUMENTS

| | | | |
|---|---|---|---|
| 10,885,191 B1 | 1/2021 | Gupta | |
| 11,095,558 B2 | 8/2021 | Cheng et al. | |
| 11,630,747 B1 * | 4/2023 | Deboy | G06F 11/3409 |
| | | | 714/22 |
| 11,962,506 B2 * | 4/2024 | Rangel Augusto | H04L 47/24 |
| 12,113,669 B1 | 10/2024 | Patel | |
| 2007/0143827 A1 * | 6/2007 | Nicodemus | H04L 63/102 |
| | | | 726/2 |
| 2012/0114331 A1 | 5/2012 | Kamijo et al. | |
| 2016/0328349 A1 * | 11/2016 | Kunnathur Ragupathi | |
| | | | G06F 1/266 |
| 2018/0359134 A1 | 12/2018 | Pech | |
| 2020/0014583 A1 * | 1/2020 | Dang | H04L 41/22 |
| 2020/0403889 A1 | 12/2020 | Nguyen | |
| 2021/0117249 A1 | 4/2021 | Doshi et al. | |
| 2023/0267198 A1 * | 8/2023 | Karpovsky | G06F 21/552 |
| | | | 726/23 |
| 2024/0205226 A1 * | 6/2024 | Lukyanov | H04L 63/0823 |
| 2025/0112942 A1 | 4/2025 | Patel | |
| 2025/0112943 A1 | 4/2025 | Patel | |
| 2025/0112951 A1 | 4/2025 | Patel | |

OTHER PUBLICATIONS

"Control Plane Policing," Cisco Systems, Inc., Nov. 2006 (36 Pages).

Strickx, Tom, "ASICs at the Edge," The Cloudflare Blog, Nov. 27, 2020, web page <https://blog.cloudflare.com/asics-at-the-edge/> accessed on Sep. 28, 2023 (22 Pages).

Cotroneo, Domenico, et al., "Overload control for virtual network functions under CPU contention," Future Generation Computer Systems 99 (2019): 164-176 (13 Pages).

* cited by examiner

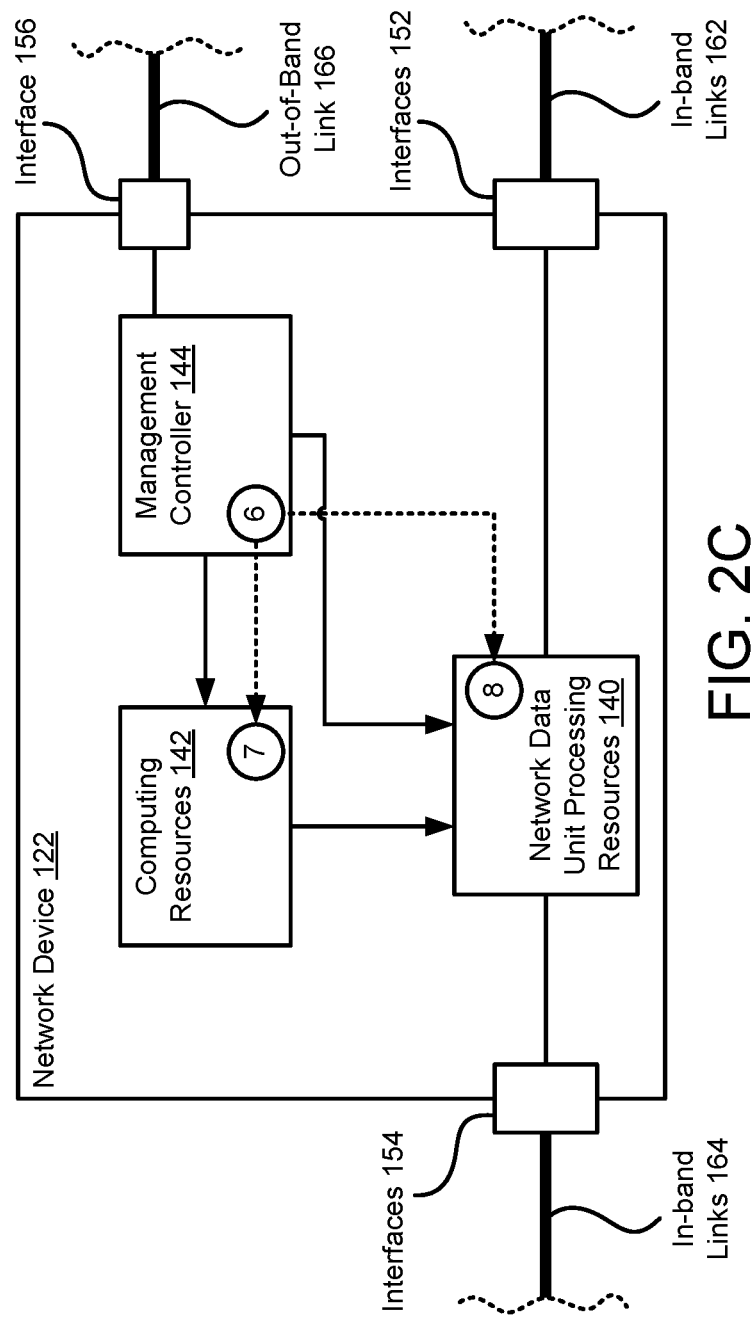

SERVICE LEVEL ENFORCEMENT IN DISTRIBUTED SYSTEM BASED ON IMPACT OF ENFORCEMENT ACTIONS

FIELD

Embodiments disclosed herein relate generally to device management. More particularly, embodiments disclosed herein relate to systems and methods to manage devices in distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2C show data flow diagrams illustrating data flows and data processing in accordance with an embodiment.

DETAILED DESCRIPTION

Figure 1A:
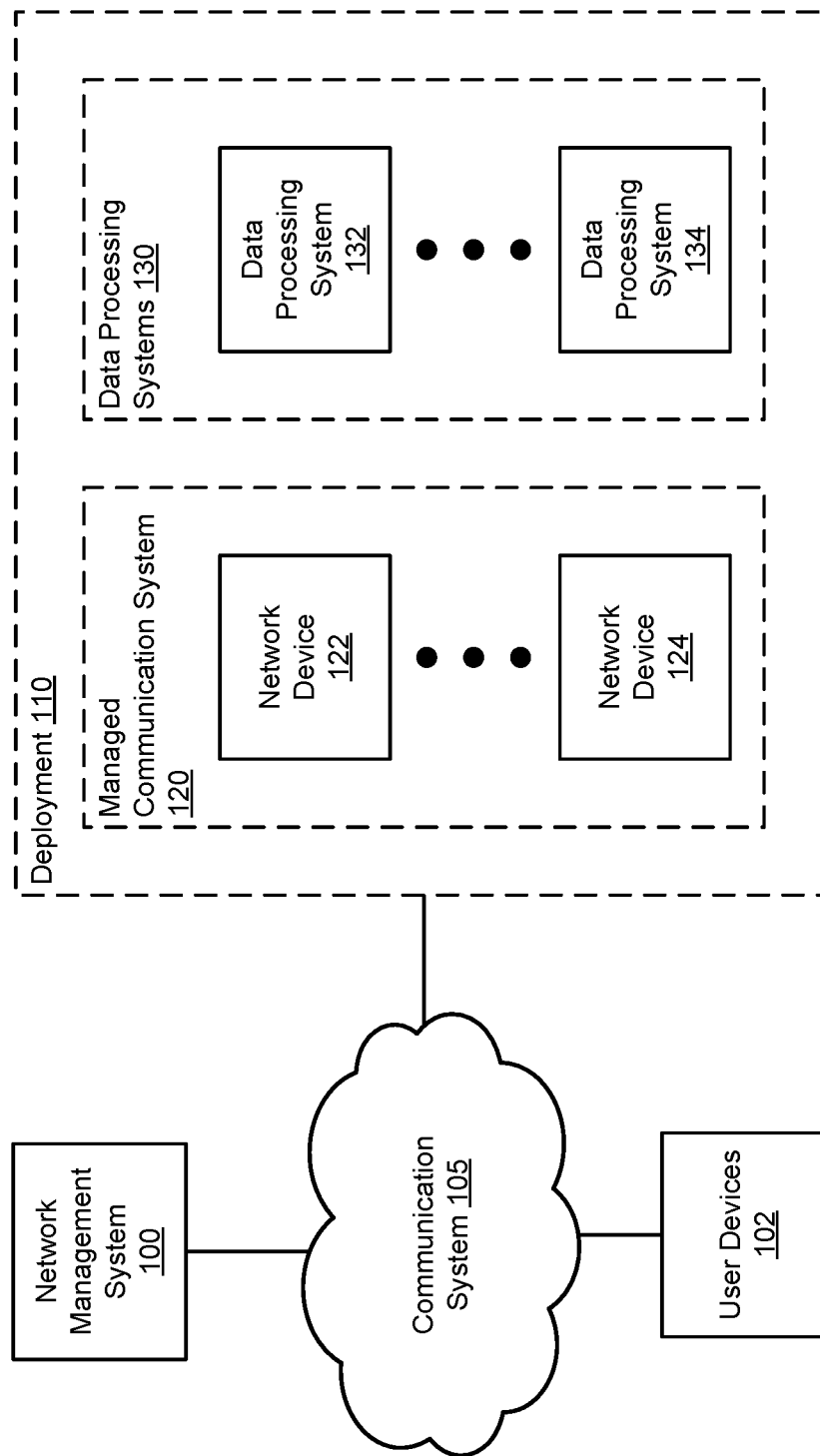
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, any number of data processing systems may be operably connected by network devices that facilitate communications used in the computer implemented services.

The configuration of the network devices may impact the ability of the data processing systems to communicate with each other. To reduce the likelihood of the network devices being undesirably configured, the network devices may be part of a managed communication system. The managed communication system may be externally managed and configured.

To facilitate configuration of the managed communication system in a desired manner, information regarding desired outcomes with respect to services provided by the managed communication system may be obtained. The information may be used to configure the network devices.

To govern the configuration, various subscriptions for the services may be entered into by the users of the services. The subscriptions may define subscription limits that limit the extent of use of the services provided by the network devices.

To enforce the subscription limits, the network devices may include management controllers. The management controllers may be independent from data and control planes of the network devices, and may enforce the subscription limits on the control plane and the data plane.

Thus, even if a network device is unable to communicate with a communication management system that manages subscriptions, the management controller may independently enforce subscription limits on the services provided by the network devices. By doing so, user of the managed communication system may obtain improved network traffic management services through improved configuration of the network devices while balancing risk presented to the remote managers of the network devices.

If a control plane is suspected of being compromised, the management controller of a network device may initiate remedial actions to confirm the suspicion. The remedial activity may include initiating transmission of data to characterize the level of service provided by a network device. The characterization may be compared to subscribed to levels of service. If a sufficient difference is apparent, then the management controller may conclude that the control plane is compromised.

If confirmed as being compromised, the management controller may perform various actions to limit operation of the control plane and conform operation of the data plane to meet the subscriptions.

When moving to enforce subscription limits, the specific enforcement actions may be selected to manage impacts on certain services. The specific enforcement actions may be selected based on the dependencies of services on network data unit processing services provided by network devices. Consequently, enforcement actions that preferentially avoid impacts on certain services may be discriminated from and selected for use over other enforcement actions that may more significantly impact the certain services.

By doing so, embodiments disclosed herein may provide desired services even while control planes of network devices are compromised. Thus, embodiments disclosed herein may address, among others, the technical problem of device security and remediation in distributed systems that may present elevated vectors of attack. The embodiments may do so through characterization of operation of network devices and corresponding remediation activity.

In an embodiment, a method of managing operation of a distributed system is provided. The method may include identifying, by a management controller of a first network device, an occurrence of a subscription enforcement event based on operation of the network device and a subscription limit for a subscription; responsive to the subscription enforcement event: identifying, by the management controller, dependencies of services provided by the distributed system to network data unit processing services provided by a data plane of the network device; obtaining, by the management controller, an enforcement action based on the subscription limit, the dependencies, and impact level goal for the enforcement action, and a perceived state of a control plane of the network device; performing, by the management controller, the enforcement action to update at least one of the control plane and the data plane to obtain an updated network data unit processing pipeline of the data plane; and providing the network data unit processing services using the updated network data unit processing pipeline.

The state may be a compromise state of the control plane.

The management controller may be adapted to, while the state is an uncompromised state, deploy network policies to the control plane to update the network data unit processing pipeline via programming by the control plane.

The management controller may be further adapted to, while the state is a compromised state, circumvent the control plane to update the network data unit processing pipeline.

The impact level goal may specify limits on levels of impact on the services provided by the distributed system, and the enforcement action may be selected to meet the limits on the levels of impact on the services.

The management controller may include a data processing system, the control plane may be hosted by computing resources of the network device, and the data processing system may operate independently from the computing resources.

The management controller may be operably connected to the computing resources via a first management channel, and the first management channel may be usable by the management controller to configure the computing resources.

The data plane may be hosted by a special purposes hardware device operably connected to in-band links through which network traffic is obtained and forwarded on to other devices, and the management controller may be operably connected to at least one other device via an out-of-band link.

The management controller may be operably connected to the special purpose hardware device via a second management channel, and the second management channel being usable by the management controller to configure the special purpose hardware device.

The special purpose hardware device may include a switch application specific integrated circuit adapted to forward network traffic.

The subscription may be for a level of service to be provided by the network device to a subscribing entity.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. The computer-implemented services may include, for example, database services, data processing services, electronic communication services, and/or any other services that may be provided using one or more computing devices.

When providing the computer implemented services, the computing devices may need to communicate with other devices. To do so, the computing devices may be operably connected to networks. The networks may facilitate communications between the computer devices and/or other devices.

The networks may include any number of network devices. The network devices may facilitate network communications by sending and receiving network data units. The network data units may include a payload and control information. The payload may correspond to data transported between devices, and the control information may facilitate network routing, switching, etc.

For example, the control information may include information regarding where a network data unit originated, a destination for the network data unit, and/or other types of information that may allow intermediary devices to decide how to forward the network data units toward corresponding destinations.

Any of the network devices may be connected to any number of other network devices and/or computing devices. There may be many options for forwarding network data units within the network environment towards destination locations.

The traffic forwarding behavior (e.g., how each network data unit is forwarded, which may include deciding out of which port to forward a network data unit, how to encapsulate the network data unit with control information, etc.) of the network devices may be configurable. The configurability may allow for forwarding preferences to be implemented. For example, the forwarding preferences may allow for administrators of a deployment to shape traffic to meet certain goals (e.g., enable high fidelity video conferences, low latency for latency dependent workloads, etc.).

However, if the forwarding preferences are out of sync with desired goals for a deployment, then operation of the deployment may be negatively impacted. For example, if traffic shaping policies are implemented that do not align the goals, then the goals may be frustrated. Selecting and applying such policies may be challenging even for experienced system administrators.

In general, embodiments disclosed herein relate to systems, devices, and methods for managing operations of networks of distributed system using a subscription system. To manage the operation of networks using the subscription system, network devices may be deployed to establish a managed communication system. When deployed, the network devices may be over provisioned by including more resources for managing network traffic than is expected to be required for traffic management purposes.

Rather than being managed by users, the managed communication system may be managed by a vendor or other organization (e.g., any being a "managed communication system provider"). The vendor may be responsible for managing operation of the managed communication system.

User, organizations, and/or other entities (e.g., any being a "managed network user") may subscribe to communication services provided by the managed communication system. The managed network users may indicate their desire for outcomes with respect to use of the communication services provided by the managed communication system.

The managed communication system provider may use the desired outcomes to establish subscriptions for the communication services.

The subscriptions may be used to define intermediate representations for configurations of network devices of the managed communication system. The intermediate representations for the configurations of the managed system may provide criteria by which each network device may measure its performance against corresponding subscription. Rather than explicitly define the configuration and operation of each network device, each (and/or groups of) network device may identify how to configure itself based on the intermediate representation. Thus, decision making authority may be distributed between the network devices and management entities tasked with managing the network devices.

To conform operation of the network devices, corresponding intermediate representations and subscriptions may be provided to the network devices. Each network device may then decide how to configure itself, and may use the intermediate representation to measure its operation with respect to corresponding subscriptions.

The provided subscriptions may include information regarding the subscriptions such as limits on the use of the network devices by managed communication system users. The network devices may independently enforce the subscription limits.

By doing so, embodiments disclosed herein may improve computer implemented services provided by a distributed system by improving the likelihood that network traffic in a manner that is aligned with the computer implemented services.

To provide the above noted functionality, the system of FIG. 1A may include network management system 100, user devices 102, communication system 105, and deployment 110. Each of these components is discussed below.

Network management system 100 may facilitate use and management of managed communication system 120 by managed communication system users. To do so, network management system 100 may (i) provide a portal (e.g., a webpage or other type of interface) through which subscriptions for services provided by managed communication system 120 may be provided, (ii) establish subscription and intermediate representation using information obtained through the portal, and (iii) distribute information regarding the subscriptions and intermediate limitations to network devices (e.g., 122-124) of managed communication system 120.

User devices 102 may be used by managed communication system users to establish subscriptions for use of managed communication system 120. User devices 102 may utilize the portal provided by network management system 100 to provide user input to network management system 100. The user input may convey desired outcomes for user of managed communication system 120.

For example, the portal may include a graphical user interface. The graphical user interface may display information regarding (i) managed communication system 120, (ii) services that managed communication system 120 may provide, (iii) existing subscriptions for user of managed communication systems, and/or other information regarding services that may be subscribed to by the user (e.g., such as used of data processing systems 130, which may be managed with a similar subscription based model). The graphical user interface may include fields in which the users of user devices 102 may input user input to convey desires for user of services, confirm acceptance of terms of subscriptions, and/or otherwise facilitate collaboration between network management system 100 and the users of user devices 102.

Deployment 110 may provide computer implemented services (e.g., to users of deployment 110 and/or to devices operably connected to deployment 110). To do so, deployment may include data processing systems 130 and managed communication system 120. Data processing systems 130 may include any number of data processing systems (e.g., 132-134) that provide the computer implemented services. When providing the computer implemented services, data processing systems 130 may generate network traffic (e.g., network data units directed to various entities) and utilize the services provided by managed communication system 120 to transmit the network data units to destinations.

Managed communication system 120 may provide managed communication services. The managed communication services may be provided in accordance with subscriptions. The managed communication services may include transmitting network traffic between data processing systems and/or other devices.

Figure 1B:
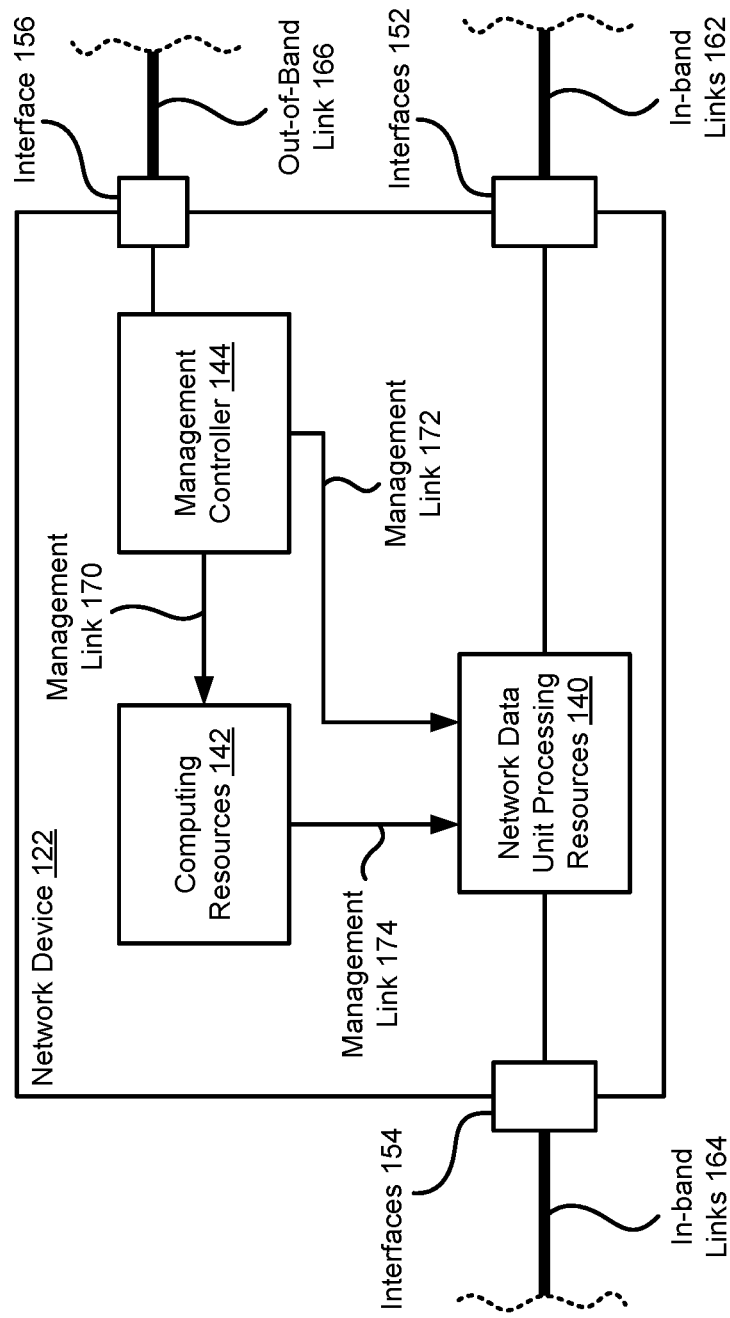
FIG. 1B shows a block diagram illustrating a network device in accordance with an embodiment.

To provide the managed communication services, managed communication system 120 may include any number of network devices (e.g., 122-124). The network devices may be organized in a network topology to facilitate transmission of network traffic. Each network device may manage its operation in accordance with intermediate representations and subscriptions provided by network management system 100. Refer to FIG. 1B for additional details regarding network devices.

When providing their functionality, any (and the components thereof) of network management system 100, user devices 102, and deployment 110 may perform any of the actions and methods illustrated in FIGS. 2A-3B.

Any of (and/or components thereof) network management system 100, user devices 102, and deployment 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

Turning to FIG. 1B, a block diagram of network device 122 in accordance with an embodiment is shown. Any of network devices 122-124 may be similar to network device 122.

To provide traffic management services, network device 122 may include network data unit processing resources 140, computing resources 142, and management controller 144. Each of these components is discussed below.

Network data unit processing resources 140 may provide configurable traffic management services. To provide the configurable traffic management services, network data unit processing resources 140 may include special purpose hardware such as a switch application specific integrated circuit (SASIC). The SASIC may include a network data unit processing pipeline used to route and switch network data units between interfaces (e.g., 154, 152).

The network data unit processing pipeline may operate in accordance with a processing standard such as the P4 programming language that allows the manner in which network data units are processed for forwarding purposes to be configured. The processing pipeline may use a routing information base and/or other data structures (e.g., equal cost multipath tables) to decide how to direct network data units. For example, when a network data unit is received, the control information may be used to decide how to forward the network data unit towards a destination. The network data unit processing pipeline may sequentially make decisions regarding which interface out of which to send the network unit, control information to add/remove from the network data unit prior to forwarding, etc.

Additionally, as noted above, the processing pipeline may add or remove control information (e.g., via encapsulation) to enable network data units (e.g., packets) to be transmitted across a network. For example, the processing pipeline may facilitate multiprotocol approaches such as a label switched network (e.g., labels added to the control information to facilitate rapid identification of egress interfaces) overlayed over an internet protocol (IP) based forwarding network. Thus, network data units with varying control information may be forwarded, and any network device may serve as an ingest point to an overlay network.

Network data unit processing resources 140 may operate as part of a data plane of network device 122. The data plane may provide traffic management services obtained from any number of in-band links (e.g., 164, 164) via corresponding interfaces (e.g., 152-154, may include physical ports). The in-band links may be organized as up/down links depending on the location of network device 122 within a network architecture. Any of the interfaces (e.g., in-band interfaces 152-154, separate from the out-of-band interfaces such as interface 156) may be reconfigurable between up/down links and/or may be bi-directional.

Network data unit processing resources 140 may be operably connected to computing resources 142. Computing resources 142 may host applications that operate as part of a control plane of network device 122. The control plane may (i) maintain information regarding the network environment in which network device 122 resides (e.g., as part of a forwarding information base), (ii) maintain information regarding various network policies to be implemented by network devices 122 (e.g., the network policies may define traffic shaping rules, quality of service requirements, and/or other types of requirements for operation of network device 122), (iii) generate/provide the routing information bases used by the data plane to make network data unit processing decisions, (iv) configure operation of the data plane (e.g., by sending instructions via management link 174) based on the routing information base, the network policies, and/or other information, and/or otherwise generally manage operation of networking device 122.

The data plane and the control plane of network device 122 may also perform various security functions for network device 122. The security functions may include scanning of network data units to identify malicious network data units. Inbound network data units may be scanned and compared to signatures of network data units that are known to carry malicious payloads. Other methods may be used to identify network data units carrying malicious payloads.

If network data units are identified (or suspected) as being malicious, network device 122 may automatically perform responses. These responses may include, for example, (i) shutting off ports receiving inbound network data units deemed to be malicious, (ii) elevate scanning and/or other procedures which may reduce network data units throughput on ports subject to increased scanning, (iii) screen network data units corresponding to certain communication protocols, and/or otherwise subject network traffic to additions scrutiny/security procedures. Any of the security procedures may be keyed, for example, to different types of malicious network data units. Thus, the response of network device 122 to different types of network data units may vary. Mappings between the types of malicious network data units and corresponding responses may be maintained by network device 122.

Figure 4:
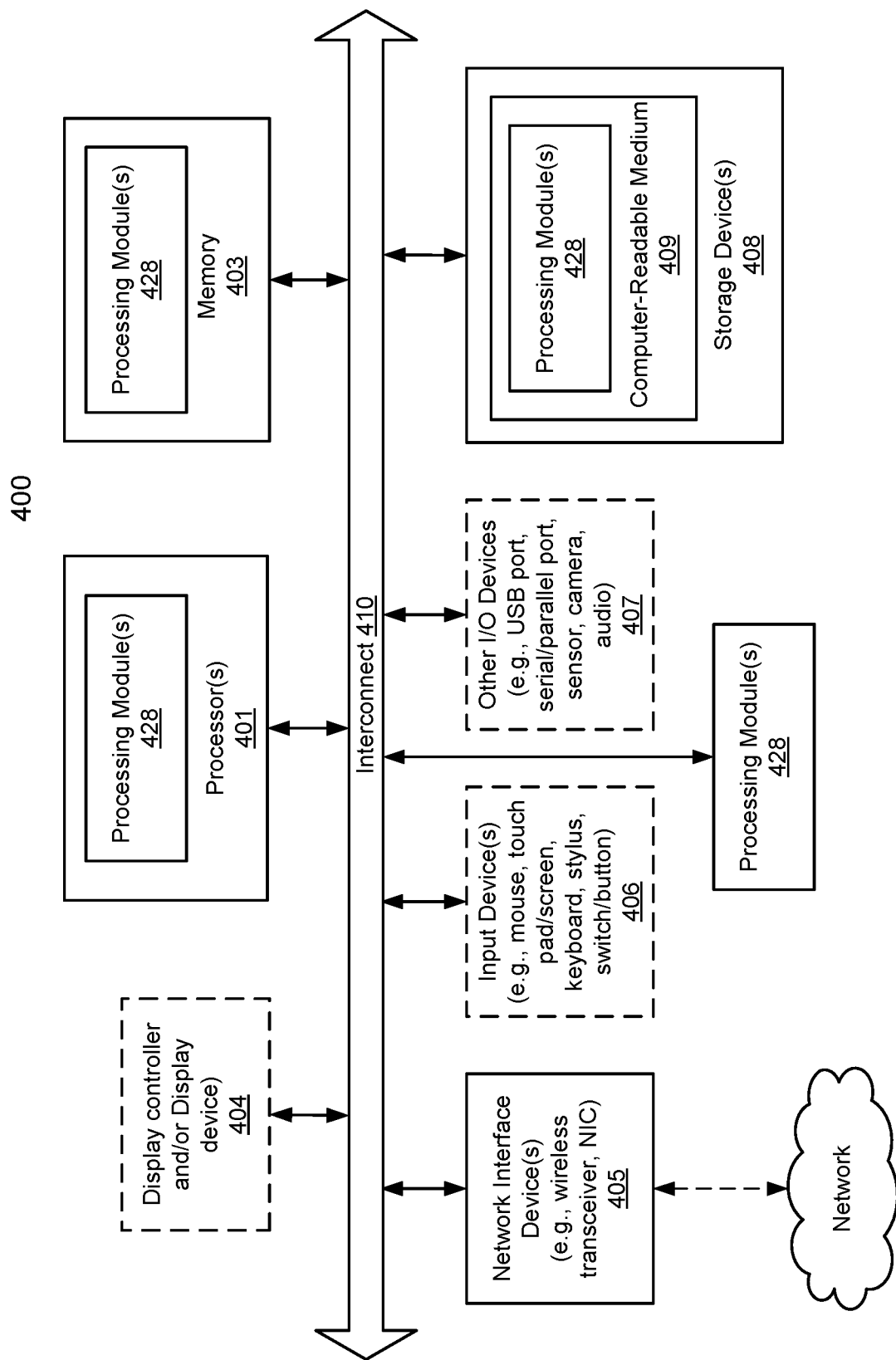
FIG. 4 shows a block diagram illustrating a data processing system in accordance with an embodiment.

Computing resources 142 may be an independently operating data processing system (e.g., refer to FIG. 4 for additional information). However, by virtue of its configurability, computing resources 142 may be subject to compromise. For example, a malicious party that has access to network device 122 may attempt to modify the operation of computing resources 142 (e.g., by installing malicious programs, malicious modifying configuration settings/data structures, modifying network policies, etc.). The malicious party may do so by virtue of physical access to the physical components of computing resources 142 and/or privileged use.

Computing resources 142 may at least to some extent be configurable by a user or subscriber to the services provided by the network device. For example, users (e.g., privileged users) may be allowed to perform various configurations which may present avenues of attack should a user initiate malicious action. If exploited, the avenues of attack may be used, for example, to cause the control plane to ignore or otherwise not enforce limits on use of the services provided by network device 122.

To limit the impacts of and/or risk of compromise of computing resources 142, management controller 144 may manage the operation of the control plane and data plane of network device 122. Management controller 144 may be implemented using a secure system on a chip (or other type of secure independently operating computing device). Management controller 144 may be operably connected to the components of the data plane and control plane via management link 172 and management link 170, respectively. These management links may give management controller 144 direct, bare metal management control over computing resources 142 and network data unit processing resources 140. Consequently, management controller 144 may directly modify the operation of any of these hardware devices, data stored by these devices, may obtain data from these hardware devices, and/or may otherwise directly manage these hardware devices. In contrast to the control plane which may at least to some extent be configurable, the management controller may not be configurable or otherwise usable by user/subscribers for services provided by the network device.

Additionally, management controller 144 may enforce subscriptions across network device 122. To enforce the subscription, management controller 144 may (i) obtain intermediate representations and information regarding subscriptions from network management system 100 via out-of-band link 166 through interface 156 (e.g., an out-of-band management port) which may provide independent network connectivity for management controller 144, (ii) use the intermediate representations to obtain configuration data for the control plane and/or data plane, (iii) modify the operation of the control plane and/or data plane based on the configuration data to update operation of the control/data plane, (iv) monitor the operation of the control/data plane with respect to subscription limits for subscribed to services provided by network device 122, and (v) enforce the subscription limits (e.g., by further modifying operation of the control/data plane).

Management controller 144 may operate as part of a management plane for network device 122. As part of its operation, management controller 144 may monitor computing resources 142 for signs of malicious activity and may, for example, take action to address the malicious activity, to blunt an impact of the malicious activity on operation of network device 122 (e.g., may quarantine computing resources 142 from network data unit processing resources 140 by disabling management links or other means), and/or may perform other actions to manage operation of network device 122. The malicious activity may include, for example, attempts by subscribers to services provided by network device 122 to circumvent subscription limits. A subscriber may attempt to do so by modifying operation of computing resources 142 and hosted software, by cutting off management controller 144 from communications with other devices (e.g., by disconnecting out-of-band link 166, and/or taking other actions to circumvent management of network device 122 by a provider.

To address such malicious activity, for example, if management controller 144 suspects that the control plane has been compromised, then management controller 144 may take action (i) to confirm the compromise, and (ii) address the compromise. Management controller 144 may do so, for example, by initiating testing of the levels of service being provided by network device 122. If malicious activity is confirmed through testing, then management controller 144 may act to address the malicious activity.

For example, when enforcing subscription limits, management controller may select enforcement actions for performance based on whether the control plane is compromised. If not compromised, new network policies and/or other changes to the control plane may be made so that the control plane may program the data plane in a manner consistent with an enforced subscription limit. However, if the control plane is compromised, then the management controller may select and perform enforcement actions that may circumvent the control plane. For example, rather than relying on the control plane to faithfully program the data plane, the management controller may enforce subscription limits by (i) directly programming the data plane, (ii) injecting workloads that consume resources of the data plane such that the operation is effectively limited in accordance with subscription limits, (iii) tricking the control plane into programming the data plane in a desired manner through, for example, providing falsified network condition reports that lead the control plane to believe that the network environment in limited in ways that are not actually present (e.g., port congestion, unreachability of other devices, etc.) which cause the control plane to program the data plane in a manner consistent with subscription limits even though corresponding network policies are being ignored, (iv) performing distributed environment where other network devices limit the ability of the network device to forward network data units to the other network devices, and/or via other methods.

However, when a subscription limit is reached, strictly enforcing the subscription limit may lead to undesired impacts. For example, if a subscription for user of a port is reached, completely preventing use of the port may undesirably impact critical services (e.g., safety/health services) that utilize network traffic that flows through that port.

Figure 2A:
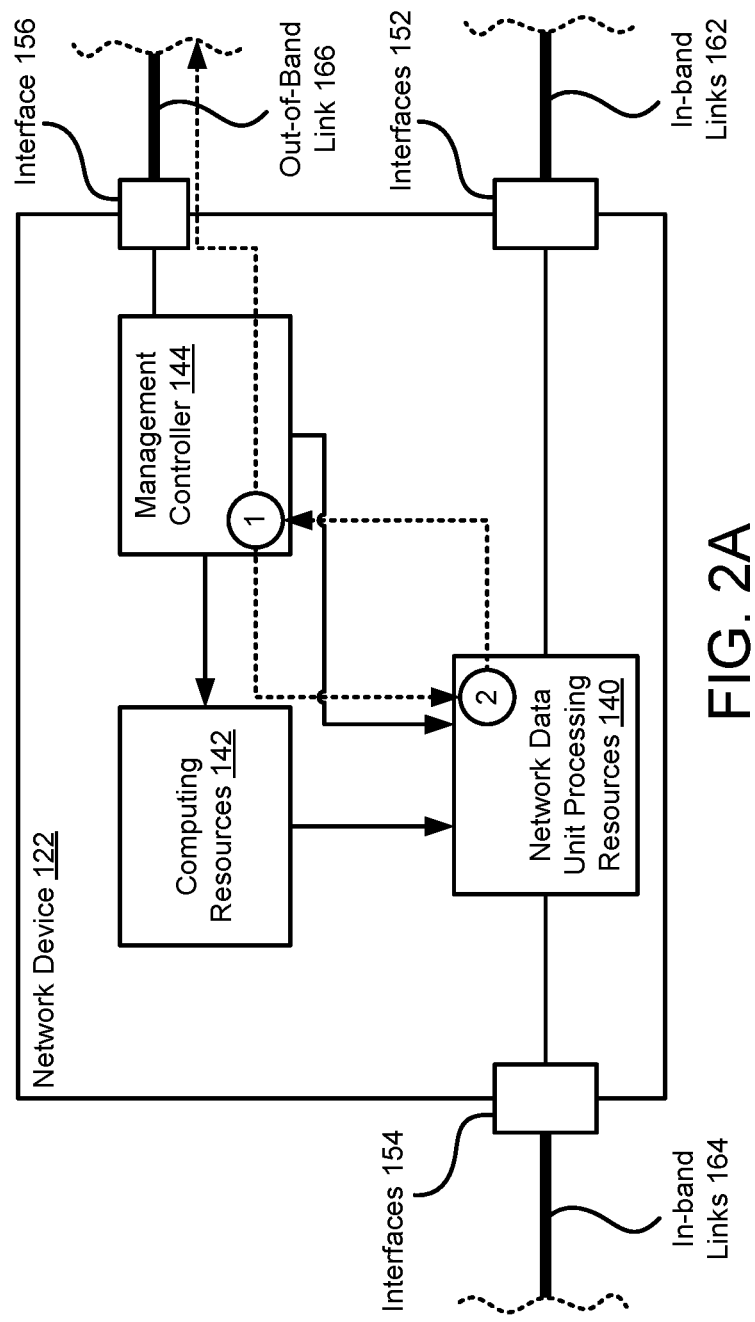
Figure 2B:
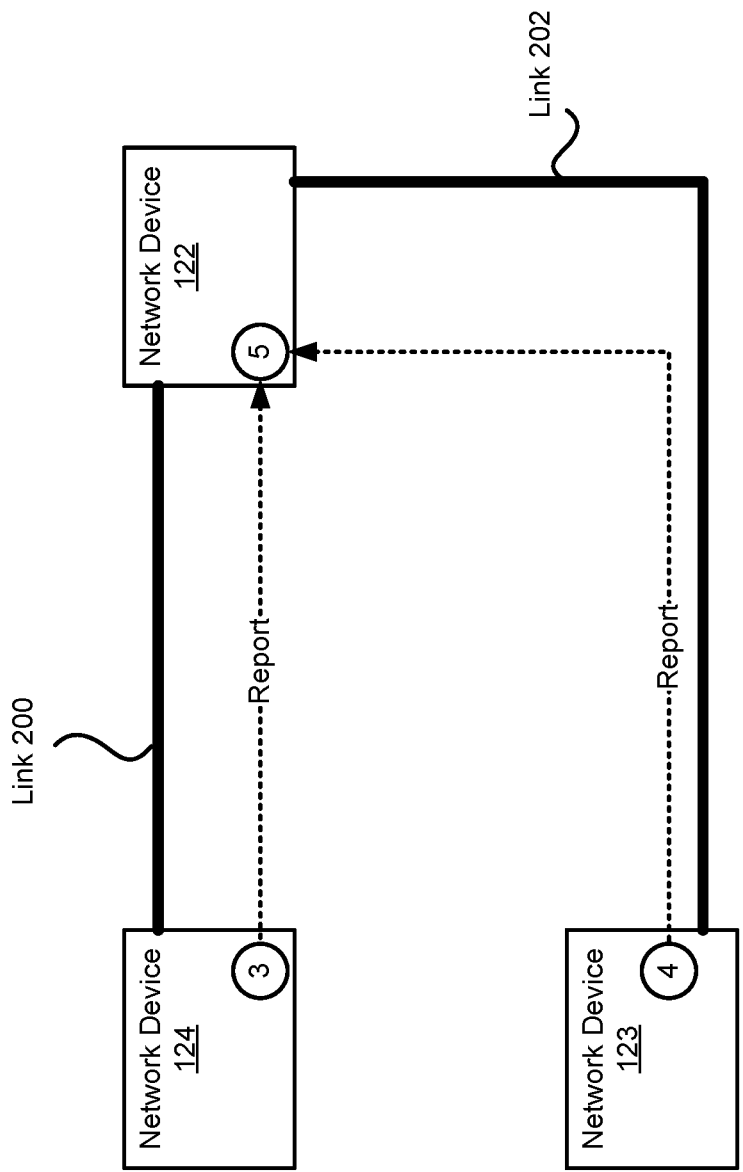

To balance the impact of enforcement of subscription limits, the downstream impacts of such enforcement may be characterized and compared to impact limits. The impact limits may, for example, provide minimum standards for certain types of services. If rigorous enforcement of subscription limits results in impacts to the governed services that exceeds the limits, then the subscription limits may be reduced such that the impact of enforcement is within these impact limits. Refer to FIGS. 2A-2C for additional details regarding enforcement of subscription limits.

While illustrated in FIG. 1B with respect to a limited number of specific components, it will be appreciated that a network device in accordance with an embodiment may include additional, fewer, and/or different components without departing from embodiments disclosed herein.

To further clarify embodiments disclosed herein, data flow diagrams showing example interactions between components of the system of FIG. 1A in accordance with an embodiment are shown in FIGS. 2A-2C. In FIGS. 2A-2C, circles including numbers are used to indicate operations occurring at different points in time. For example, all operations described with reference to number one (1) may occur at a first point in time and all operations described with reference to the number two (2) may occur at a second point in time after the first point in time, etc. While the operations are provided in an example temporal order (e.g., time point one before time point two), it will be appreciated that the operations may be performed in other orders from those illustrated and described herein. The circles are overlayed on top of components that may perform the corresponding operations.

Turning to FIG. 2A, a first data flow diagram in accordance with an embodiment is shown. FIG. 2A may illustrate a first example scenario where, at operation 1, management controller 144 may suspect that the control plane of networking device 122 is compromised. Management controller 144 may suspect that the control plane is compromised, for example, based on behavior exhibited by computing resources 142.

For example, an untrusted application may be executing on computing resources 142, network policies (e.g., created by management controller 144) may appear to be being ignored by the control plane, etc. One of the network policies may specify a default use policy that generally limits use of the functionality of network device 122 absent other policies, but the operation of the control and/or data plane may appear to exceed that and other policies. In other words, computing resources 142 and the hosted control plane may appear to be ignoring or otherwise not using/enforcing the default use policy and/or other network policies.

Additionally, management controller 144 may monitor operation of the data plane and/or other aspects of the operation of network device 122 for compliance with subscriptions. If a subscription limit is reached, then management controller 144 may initiate subscription limit enforcement.

To initiate subscription limit enforcement, management controller 144 may perform an impact assessment of different enforcement actions that may be performed. To perform the impact assessment, information regarding the dependence on different services provided by a distributed system on network data unit processing services provided by network device 122 may be obtained.

To obtain the information, requests for reports regarding these dependencies may be sent to other network devices. The requests may be sent via out-of-band link 166 (if available, may not always be available) and/or the in-band links. For example, the requests may be injected into the data processing pipeline of the data plane.

When injected, at operation 2, the data plane may encapsulate the requests to obtain network data units, and send the network data units to the other network devices via in-band links (e.g., 164-162). Refer to FIG. 2B for additional details regarding obtaining reports of service dependencies.

In addition to obtaining reports from remote network devices, management controller 144 may also monitor the operation of the data plane of network device 122. During the monitoring, network data units received and forwarded by network device 122 may be classified with respect to different services. Any classification method may be used. The network data unit processing (e.g., ingress/egress port) perform on the network data units may be used to identify dependence of different types of services on the network data unit processing performed by network device 122.

For example, the number of network data units for a given service that flows through corresponding ports, that are subject to certain types of processing (e.g., encapsulation processes), and/or other aspects of network data unit processing services provided by network device 122 and that may be impacted by enforcement actions may be identified. Thus, a map between different enforcement actions and impacted services/levels of impact may be established. The map may also be supplemented with similar information from other network devices to obtain a distributed system wide assessment of the impact that different enforcement actions may have on different services.

For example, if a health or safety related services transmits a significant number of network data units through a port of network device 122, then an enforcement action of shutting down the port may have a high degree of impact on the services (e.g., highly disruptive impact).

Once the reports and local monitoring is performed, the impact of different types of enforcements actions may be identified and used to select enforcement actions to perform (e.g., that do not have impacts that exceed impact limits). Refer to FIG. 2C for additional details regarding selection of enforcement actions.

Turning to FIG. 2B, a second interaction diagram in accordance with an embodiment is shown. FIG. 2B may illustrate a second example scenario where, after requests are sent to management controller of network devices 123-124, reports are returned to the management controller of network device 122.

The reports may be generated by the management controller of network devices 123-124 similarly to the monitoring performed by network device 122 and described with respect to FIG. 2A.

Once the reports are obtained by network devices 123-124), at operations 3-4, the reports may be provided to the management controller 144 (e.g., either via in-band or out-of-band links). For example, the reports may be provided via links 200-202 which may be in-band or out-of-band links Once the reports are obtained by network device 122, the reports may be used in conjunction with the monitoring to establish a map between different enforcement actions and levels of impact. For example, at operation 5, network device 122 may aggregate, consolidate, and/or otherwise process the locally collected and remotely collected information regarding dependency of various services on different aspects of operation of network device 122 thereby allowing for impact of different types of enforcement actions to identified and compared to impact limits.

Turning to FIG. 2C, a third interaction diagram in accordance with an embodiment is shown. FIG. 2C may illustrate a third example scenario where, after dependencies of different services on network data units processing services provided by network device 122 are identified, at operation 6, an enforcement action is selected. The enforcement action may be selected by evaluating different enforcement actions (e.g., that when implemented impact the network data unit processing behavior of the data plane) with respect to impact on the services and impact level goals for the services. Any number of enforcement actions may be evaluated to identify at least one that is able to meet the impact level goals.

For example, enforcement actions may be stored in a repository. Each enforcement action may be evaluated using the dependencies to identify a level of impact on different services that utilize the network data processing services provided by the data plane of network device 122. The level of impact each of the services may then be compared to the impact levels for the services (e.g., thresholds) to ascertain whether the enforcement action is acceptable.

To ascertain the level of impact that an enforcement action has on a service, the level of dependency of that service on a characteristic of the network data processing services that will be impacted by the enforcement action will have may be identified. For example, if a service has a high level of a port and the enforcement action impacts the port (e.g., closes the port, reduces the usable bandwidth of the port), then the service may be impacted by performance of the enforcement action. To ascertain the level of impact, a formula, scoring table, or other system for quantifying the level of impact that the enforcement has on the service may be used. For example, the scoring system may ingest the information about the use of the port by the service and enforcement action and output a quantification for the level of impact. The scoring system may be established by a subject matter expert, an automated process, or other method.

The level of impact on each of the services may then be, for example, compared to corresponding impact level thresholds for the services or may be otherwise analyzed to ascertain whether a given enforcement action is acceptable in view of the impact level thresholds (and/or other criteria for distinguishing acceptable from unacceptable enforcement actions).

The enforcement action that is both acceptable and most likely to conform the operation of the data plane to the subscription limit may be selected. Once selected, at operations 7-8, the enforcement actions may be performed. The enforcement actions may be performed by (i) if the control plane is not suspected of being compromised by generating/sending a new network policy that correspondingly limits operation of the data plane or (ii) if the control plane is suspected of being compromised, by circumventing the control plane, tricking the control plane, and/or otherwise cause operation of the data plane to be updated in accordance with the subscription limit.

Thus, using the method shown in FIG. 2A-2C, embodiments disclosed herein may facilitate subscription enforcement while limiting impact on different services. The impact may be limited by ensuring that certain services (e.g., health, safety, privacy, etc.) are not impacted beyond acceptable levels by enforcement of subscription limits.

Figure 3A:
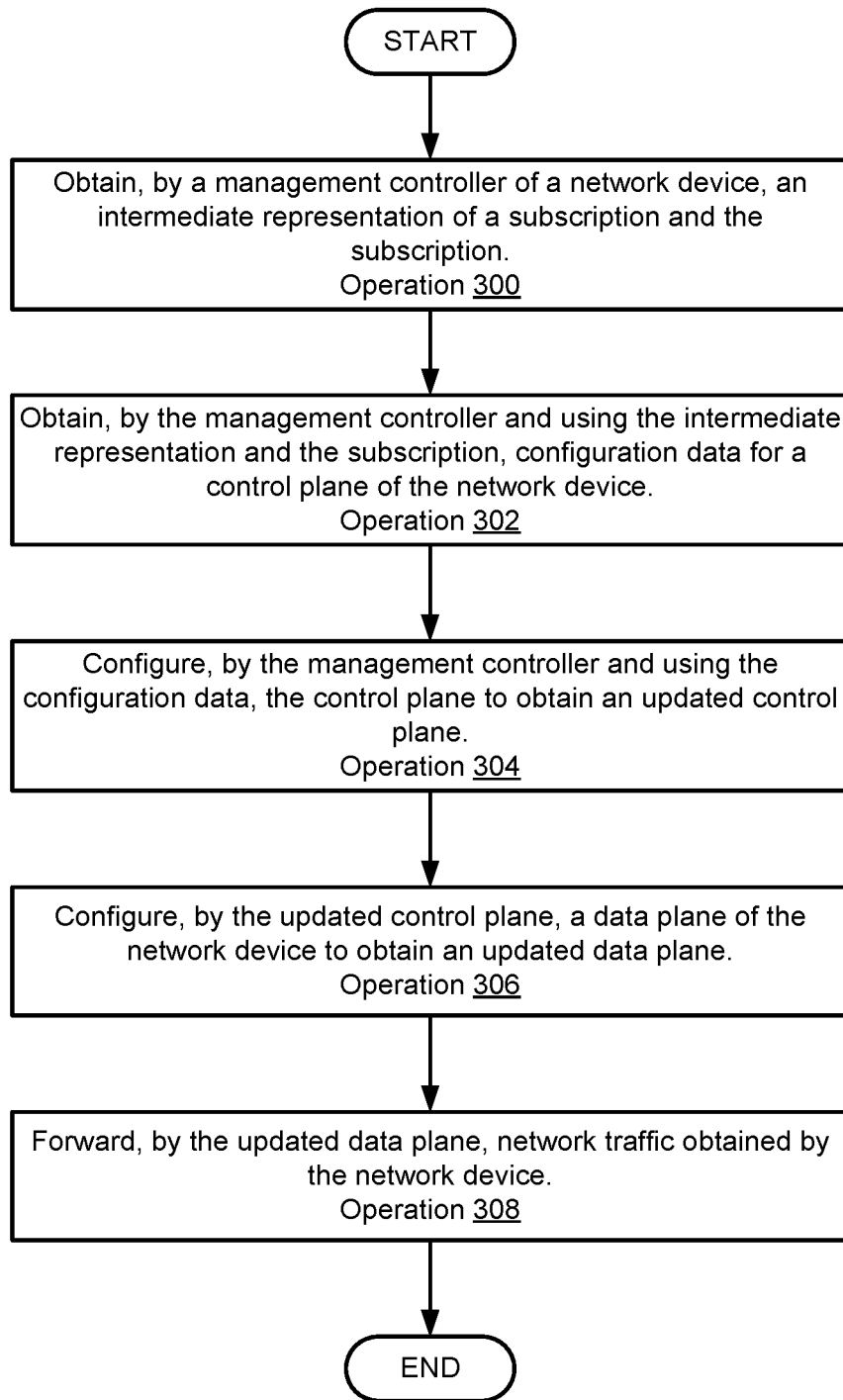
FIGS. 3A-3B show flow diagrams illustrating methods in accordance with an embodiment.
Figure 3B:
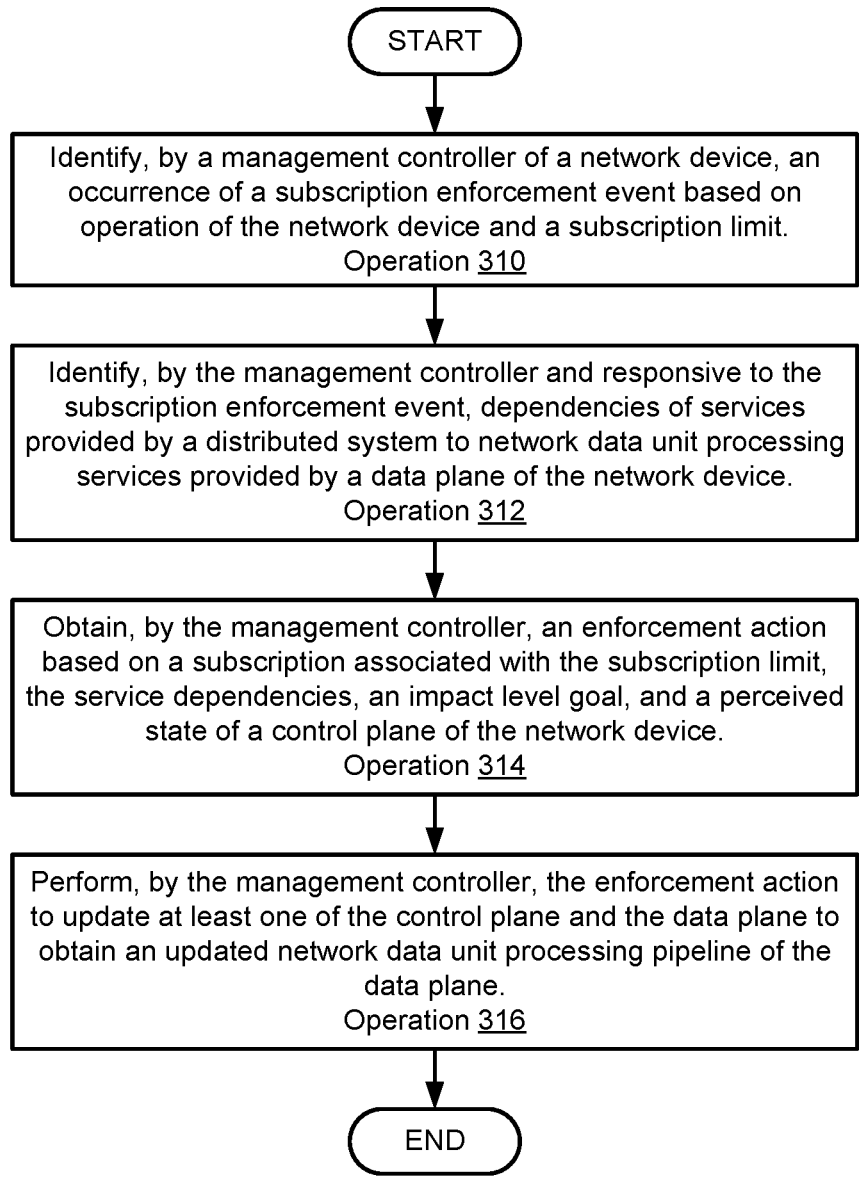

As discussed above, the components of FIG. 1A may perform various methods to manage operation of a distributed system through management of communication systems. FIGS. 3A-3B illustrate methods that may be performed by the components of the system shown in FIGS. 1A-2C. In the diagram discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of managing services provided by a network device in accordance with an embodiment is shown. The method may be performed, for example, by a deployment, a network management system, a user device, and/or devices of the system of FIGS. 1A-2C and/or components thereof.

Prior to operation 300, a user may interact with a network management system to establish use of services by a managed communication system. The interaction may result in the generation of an intermediate representation and a subscription.

At operation 300, the intermediate representation and the subscription are obtained by a management controller of a network devices of the managed communication system. The intermediate representation and subscription may be obtained by reading them from storage, receiving them from another device (e.g., the network management system), through generation based on user input, and/or via other methods. If received from another device, the intermediate representation and the subscription may be received via an out-of-band link.

At operation 302, configuration data for a control plane of the network device is obtained by the management controller and using the intermediate representation and the subscription. The configuration data may be obtained by applying a set of result, a model, and/or a different algorithm to generate the configuration data.

The configuration data may also be obtained using information regarding the network device that is known to the management controller. For example, the information may regarding the network device may include capabilities (e.g., hardware/software components) of the network device, responsibilities (e.g., other subscription supported by the network device, various workloads) of the network device, the network information regarding the network environment in which the network device resides, historical activity (e.g., attempts to compromise the network device), and/or other types of information regarding the network device.

The resulting configuration data may include, for example, network policies and/or other types of data usable to update operation of the control plane.

For example, consider a scenario where an intermediate representation sets a latency goal for traffic forwarded to a second network device to be under a predetermined threshold level. To establish a network policy that facilitates accomplishing the aforementioned goal, the management controller may analyze the underlying capabilities of the network device, the existing network policies (e.g., to screen for conflicts), and/or other factors that are unknown to the network management system. Thus, the resulting network policy may have a far higher likelihood of successfully accomplishing the goal.

At operation 304, the control plane may be configured by the management controller using the configuration data to obtain an updated control plane. The control plane may be configured by generating and sending instructions to the control plane via a management channel. The instructions may, when performed by the control plane, cause the network policy to be integrated into and/or otherwise used in programming of the data plane (e.g., during a future programming cycle which may be triggered by the new network policy). For example, the network policy may cause the routing information base used by the data plane to be updated thereby causing the data plane to forward network traffic differently.

At operation 306, the data plane of the network devices is configured by the updated control plane to obtain an updated data plane. The updated control plane may, based on its updated operation, update the routing information base and/or other data structures (e.g., feature enablement/disablement). The routing information base and/or other data structures may be automatically used to program the data plane in a next update cycle for the data plane.

At operation 308, network traffic obtained by the network device is forwarded by the updated data plane. The network traffic may be processed differently by the data plane when compared to being updated. For example, one or more features of the data plane previously disabled may be updated, different quality of service requirements may be enforced, etc. Thus, when a network data unit is obtained as part of the network traffic, the manner in which it is processed by a processing pipeline of the updated data plane may apply different control information (e.g., may apply a label giving the network data unit a higher priority), may prioritize the network data unit for processing based on its control information, etc.

The method may end following operation 308.

Thus, via the method shown in FIG. 3A, embodiments disclosed herein may provide a network device that may be remotely managed in accordance with a subscription based management model.

Turning to FIG. 3B, a second flow diagram illustrating a method of managing services provided by a network device based on subscriptions in accordance with an embodiment is shown. The method may be performed, for example, by a deployment, a network management system, a user device, and/or devices of the system of FIGS. 1A-2C and/or components thereof.

At operation 310, an occurrence of a subscription enforcement event is identified by a management controller of a network device. The subscription enforcement event may be identified based on operation of the network device and a subscription limit of a subscription. The subscription limit may be a use based, time based, or other type of limit on use of network data unit processing by the network device. The occurrence may be identified by monitoring operation of the network device and comparing the operation to the subscription limit. When met, the occurrence of the subscription enforcement event may be identified.

At operation 312, dependencies of services provided by a distributed system on the network data unit processing services provided by a data plane of the network device are identified by the management controller responsive to the subscription enforcement event. The dependencies may be identified as discussed with respect to FIGS. 2A-2C. For example, local and remote measurements (e.g., from other network devices) of use of network data unit processing services by various services may be obtained and used to establish relationships between the service and the network data unit processing services.

At operation 314, an enforcement action based on the subscription associated with the subscription limit, the service dependencies, an impact level goal, and a perceived state of the control plane of the network device may be obtained by the management controller. The enforcement action may be obtained by (i) if the perceived state is a compromised state, discriminating some enforcement actions of any number that may be performed based on the perceived state (e.g., whether the control plane is compromised) to identify a first set of candidate enforcement actions, (ii) discriminating some enforcement actions from the first set of candidate enforcement actions based on the how the subscription indicates that the data plane should be updated (e.g., reduced functionality) to obtain a second set of candidate enforcement actions, (iii) discriminating some of the second set of candidate enforcement actions based on the service dependencies and the impact level goal to obtain a third set of candidate enforcement actions, and (iv) selecting an enforcement action from the third set of candidate enforcement actions (e.g., the enforcement action most likely to conform the operation of the data plane to the subscription). If the perceived state is not a compromised state, then a network policy corresponding to the subscription limit may be generated and the enforcement action may be to instruct the control plane to implement the network policy.

At operation 316, the enforcement action may be performed by the management controller to update at least one of the control plane and the data plane to obtain an updated network data unit processing pipeline of the data plane. If the control plane is updated, then the control plane may program the data plane to update the data plane accordingly thereby updating the network data unit processing pipeline.

Network data unit processing services may be provided using the updated network data unit processing pipeline (e.g., which may operate in a manner closer to that specified by the subscription).

The method may end following operation 316.

Thus, using the method shown in FIG. 3B, embodiments disclosed herein may enable enforcement of subscriptions. The subscription may be enforced in a manner that is independent from nominal operation of a control plane and/or data plane. For example, even when the control plane is compromised, the management plane may likely remain uncompromised thereby allowing the management controller to initiate performance of actions to enforce the subscription limits.

The specific enforcement actions may be selected so that certain services are not overly impacted by the updated operation of the network device following performance of the enforcement actions. Thus, embodiments disclosed herein may facilitate subscription enforcement while managing impact on various services, such as services related to health, safety, government regulation, etc.

Thus, using the method shown in FIGS. 3A-3B, embodiments disclosed herein may enforce subscriptions even when control planes of network devices are compromised.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing operation of a distributed system, the method comprising:
   identifying, by a management controller of a network device, an occurrence of a subscription enforcement event based on operation of the network device and a subscription limit for a subscription associated with one or more network data unit processing services provided by a data plane of the network device, the subscription limit defines an extent of use of the one or more network data unit processing services based on one or more terms in the subscription;
   responsive to the subscription enforcement event:
      identifying, by the management controller, dependencies of services provided by the distributed system to the one or more network data unit processing services and a perceived state of a control plane of the network device, the perceived state of the control plane being separate from a quality of the services and the dependencies of the services;
      obtaining, by the management controller, an enforcement action based on the subscription limit, the dependencies, an impact level goal for the enforcement action, and the perceived state of the control plane of the network device;
      performing, by the management controller, the enforcement action to update at least one of the control plane and the data plane to obtain an updated network data unit processing pipeline of the data plane; and
      providing the one or more network data unit processing services using the updated network data unit processing pipeline.

2. The method of claim 1, wherein the perceived state indicates whether the control plane is in a compromised state where the control plane has been modified by a third party not associated with and without permission from an entity associated with the distributed system to circumvent the subscription limit defined by the subscription.

3. The method of claim 2, wherein the management controller is adapted to, while the perceived state is an uncompromised state, deploy network policies to the control plane to update the network data unit processing pipeline via programming by the control plane.

4. The method of claim 2, wherein the management controller is adapted to, while the perceived state is a compromised state, circumvent the control plane of the network device to update the network data unit processing pipeline, the management controller is neither part of the control plane of the network device nor part of the data plane of the network device.

5. The method of claim 1, wherein the impact level goal specifies limits on levels of impact on the services provided by the distributed system, and the enforcement action being selected to meet the limits on the levels of impact on the services.

6. The method of claim 1, wherein the management controller comprises a data processing system, the control plane is hosted by computing resources of the network device, and the data processing system operates independently from the computing resources.

7. The method of claim 6, wherein the management controller is operably connected to the computing resources via a first management channel, and the first management channel being usable by the management controller to configure the computing resources.

8. The method of claim 7, wherein the data plane is hosted by a special purposes hardware device operably connected to in-band links through which network traffic is obtained and forwarded on to other devices, and the management controller is operably connected to at least one other device via an out-of-band link.

9. The method of claim 8, wherein the management controller is operably connected to the special purpose hardware device via a second management channel, and the second management channel being usable by the management controller to configure the special purpose hardware device.

10. The method of claim 1, wherein the management controller that is physically installed internally within the network device is an independently operating computing device that operates independently from the network device in which it is installed and comprises a first network interface port that is separate and distinct from a second network interface port of the network device, the first network interface port and the second network interface port are physically installed in the network device, and the first network interface port connects the network device to external devices using an out-of-band link while the second network interface port connects the network device to external devices using an in-band link that is different and separate from the out-of-band link.

11. The method of claim 1, wherein the network device comprises a switch application specific integrated circuit (SASIC) that routes and switches network data units, the SASIC being configured as the data plane of the network device and is distinct and separate from a processor of the network device that is configured as the control plane.

12. The method of claim 1, wherein the management controller is a secure system on a chip comprising a second processor, the management controller is physically installed internally within the network device and comprises direct, bare metal control over the one or more network data unit processing services of the network device and over hardware resources installed within the network device that allow the management controller to modify operations of the one or more network data unit processing services and the hardware resources without using a first processor of the network device, and the first processor is a main processor of the network device.

13. The method of claim 1, wherein the control plane of the network device is configured to enforce the subscription limit for the subscription and is separate from the one or more network data unit processing services provided by a data plane of the network device and from the services provided by the distributed system.

14. A non-transitory machine-readable medium having instructions stored therein, which when executed by a processor, cause a network device to perform operations for managing operations of a distributed system, the operations comprising:
  identifying, by a management controller of a network device, an occurrence of a subscription enforcement event based on operation of the network device and a subscription limit for a subscription associated with one or more network data unit processing services provided by a data plane of the network device, the subscription limit defines an extent of use of the one or more network data unit processing services based on one or more terms in the subscription;
  responsive to the subscription enforcement event:
    identifying, by the management controller, dependencies of services provided by the distributed system to the one or more network data unit processing services and a perceived state of a control plane of the network device, the perceived state of the control plane being separate from a quality of the services and the dependencies of the services;
    obtaining, by the management controller, an enforcement action based on the subscription limit, the dependencies, an impact level goal for the enforcement action, and the perceived state of the control plane of the network device;
    performing, by the management controller, the enforcement action to update at least one of the control plane and the data plane to obtain an updated network data unit processing pipeline of the data plane; and
    providing the one or more network data unit processing services using the updated network data unit processing pipeline.

15. The non-transitory machine-readable medium of claim 14, wherein the perceived state is a compromised state of the control plane.

16. The non-transitory machine-readable medium of claim 15, wherein the management controller is adapted to, while the perceived state is an uncompromised state, deploy network policies to the control plane to update the network data unit processing pipeline via programming by the control plane.

17. The non-transitory machine-readable medium of claim 16, wherein the management controller is further adapted to, while the perceived state is a compromised state, circumvent the control plane to update the network data unit processing pipeline.

18. A network device, comprising:
  a processor; and
  a memory coupled to the processor to store instructions, which when executed by the processor, cause the network device to perform operations for managing operations of a distributed system, the operations comprising:
    identifying, by a management controller of the network device, an occurrence of a subscription enforcement event based on operation of the network device and a subscription limit for a subscription associated with one or more network data unit processing services provided by a data plane of the network device, the subscription limit defines an extent of use of the one or more network data unit processing services based on one or more terms in the subscription;
    responsive to the subscription enforcement event:
      identifying, by the management controller, dependencies of services provided by the distributed system to the one or more network data unit processing services and a perceived state of a control plane of the network device, the perceived state of the control plane being separate from a quality of the services and the dependencies of the services;
      obtaining, by the management controller, an enforcement action based on the subscription limit, the dependencies, an impact level goal for the enforcement action, and the perceived state of the control plane of the network device;
      performing, by the management controller, the enforcement action to update at least one of the control plane and the data plane to obtain an updated network data unit processing pipeline of the data plane; and
      providing the one or more network data unit processing services using the updated network data unit processing pipeline.

19. The network device of claim 18, wherein the perceived state is a compromised state of the control plane.

20. The network device of claim 19, wherein the management controller is adapted to, while the perceived state is an uncompromised state, deploy network policies to the control plane to update the network data unit processing pipeline via programming by the control plane.

* * * * *